US011190552B2

(12) United States Patent
Luotojarvi et al.

(10) Patent No.: US 11,190,552 B2
(45) Date of Patent: Nov. 30, 2021

(54) GATEWAY CONFIGURATIONS IN INDUSTRIAL INTERNET OF THINGS

(71) Applicant: ABB Schweiz AG, Baden (CH)

(72) Inventors: Mika Luotojarvi, Espoo (FI); Antti Saarela, Vihti (FI); Matti Saavalainen, Helsinki (FI); Simo Saynevirta, Espoo (FI)

(73) Assignee: ABB Schweiz AG, Baden (CH)

( * ) Notice: Subject to any disclaimer, the term of this patent is extended or adjusted under 35 U.S.C. 154(b) by 120 days.

(21) Appl. No.: 16/571,852

(22) Filed: Sep. 16, 2019

(65) Prior Publication Data
US 2020/0014730 A1 Jan. 9, 2020

Related U.S. Application Data

(63) Continuation of application No. PCT/EP2018/056607, filed on Mar. 15, 2018.

(30) Foreign Application Priority Data

Mar. 15, 2017 (EP) .................................... 17161147

(51) Int. Cl.
H04W 4/20 (2018.01)
H04L 12/26 (2006.01)
(Continued)

(52) U.S. Cl.
CPC .......... *H04L 65/103* (2013.01); *G05B 19/418* (2013.01); *H04L 12/66* (2013.01);
(Continued)

(58) Field of Classification Search
CPC ..... H04L 65/103; H04L 63/20; H04L 43/065; H04L 43/0876; G05B 19/418; H04W 4/20
See application file for complete search history.

(56) References Cited

U.S. PATENT DOCUMENTS

2011/0074598 A1* 3/2011 Cornwall ............... G01D 4/002
340/870.01
2014/0137241 A1* 5/2014 Smith ................. H04L 63/1441
726/22
(Continued)

FOREIGN PATENT DOCUMENTS

EP 2660667 A2 * 5/2013 ............. H04L 29/08
EP 2660667 A2 * 6/2013 ............. G05B 19/42
(Continued)

OTHER PUBLICATIONS

European Patent Office, International Search Report & Written Opinion issued in corresponding Application No. PCT/EP2018/056607, dated Jun. 27, 2018, 15 pp.
(Continued)

Primary Examiner — Diane L Lo
Assistant Examiner — Abusayeed M Haque
(74) Attorney, Agent, or Firm — Leydig, Voit & Mayer, Ltd.

(57) ABSTRACT

A gateway or corresponding computing device acting as a gateway in an IoTSP system, for example, is provided with gateway configurations defining at least how to monitor functionality of the gateway. The gateway monitors its functionality according to the gateway configurations. The monitoring may relate to telemetry data, hardening, and/or external experience data.

18 Claims, 4 Drawing Sheets

(51) Int. Cl.
*H04L 29/08* (2006.01)
*H04L 12/66* (2006.01)
*H04L 29/06* (2006.01)
*G05B 19/418* (2006.01)
*H04L 12/24* (2006.01)

(52) U.S. Cl.
CPC .......... *H04L 41/0806* (2013.01); *H04L 63/20* (2013.01); *H04L 67/12* (2013.01)

(56) References Cited

U.S. PATENT DOCUMENTS

| | | | | |
|---|---|---|---|---|
| 2014/0137243 A1* | 5/2014 | Reutter | ............... | H04L 63/1441 726/22 |
| 2015/0095298 A1* | 4/2015 | Mann | .................... | G06F 16/211 707/698 |
| 2015/0188949 A1* | 7/2015 | Mahaffey | .............. | H04W 12/37 726/1 |
| 2016/0078520 A1* | 3/2016 | Nice | .................... | G06F 16/9535 705/26.7 |
| 2016/0294800 A1* | 10/2016 | Oppenheim, Jr. | .. | G06F 16/2455 |
| 2016/0352640 A1 | 12/2016 | Kompella et al. | | |
| 2017/0109380 A1* | 4/2017 | Crawford | ................ | G06F 16/22 |
| 2017/0187782 A1* | 6/2017 | Crawford | ............ | G06F 11/3006 |
| 2017/0230733 A1* | 8/2017 | Rana | ........................ | H04Q 9/00 |

FOREIGN PATENT DOCUMENTS

| | | |
|---|---|---|
| EP | 2660667 A2 | 11/2013 |
| EP | 2960841 A1 | 12/2015 |

OTHER PUBLICATIONS

European Patent Office, Search Report issued in corresponding Application No. 17161147.8, dated Aug. 18, 2017, 2 pp.

* cited by examiner

GATEWAY CONFIGURATIONS IN INDUSTRIAL INTERNET OF THINGS

FIELD

The present invention relates to gateways in Industrial Internet of Things.

BACKGROUND ART

The evolvement of networking between computers and computing devices, especially different sensors, capable to communicate over the Internet without user involvement, has led to a so called Internet of Things intended for domestic appliances, and to Industrial Internet of Things intended for professional/enterprise use. The Industrial Internet of Things is a network concept which connects an industrial Thing and its embedded one or more sensors, for example, with the Internet, for open information exchange and communication, in order to achieve tracking, monitoring and management of the Thing, for example. It has been estimated that the number of Internet-connected devices is likely to multiply to tens of billions. One solution is to combine cloud storage and edge computing devices, called gateways, to collect and process data generated by the Things, and to monitor the Things. Hence the operation of the gateways is crucial for the system to work.

SUMMARY

An object of the present invention is to provide a mechanism to monitor operations of a gateway. The object of the invention is achieved by a method, an apparatus, a computer program product and a non-transitory computer readable medium which are characterized by what is stated in the independent claims. The preferred embodiments of the invention are disclosed in the dependent claims.

A general aspect of the invention uses one or more gateway configurations to set up and monitor one or more gateway operations. That provides a mechanism with which it is, for example, possible to control operations and cyber security of a gateway.

BRIEF DESCRIPTION OF THE DRAWINGS

In the following, exemplary embodiments will be described in greater detail with reference to accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any system implementing central management and edge computing to data collected by Industrial Internet of Things, or a corresponding industrial system generating data. Below different embodiments and examples are described assuming that concepts called cloud computing and virtualization is used, without restricting the embodiments/examples to such a solution. The virtualization may allow a single physical computing device to host one or more instances of virtual machines that appear and operate as independent computing devices so that a single physical computing device can create, maintain, delete, or otherwise manage virtual machines in a dynamic manner. It is also possible that device operations will be distributed among a plurality of servers, nodes, devices or hosts. In cloud computing network devices, computing devices and/or storage devices provide shared resources. Some other technology advancements, such as Software-Defined Networking (SDN), may cause one or more of the below described functionalities to be migrated to any corresponding abstraction or apparatus or device. Therefore, all words and expressions should be interpreted broadly and they are intended to illustrate, not to restrict, the embodiment.

Figure 1:
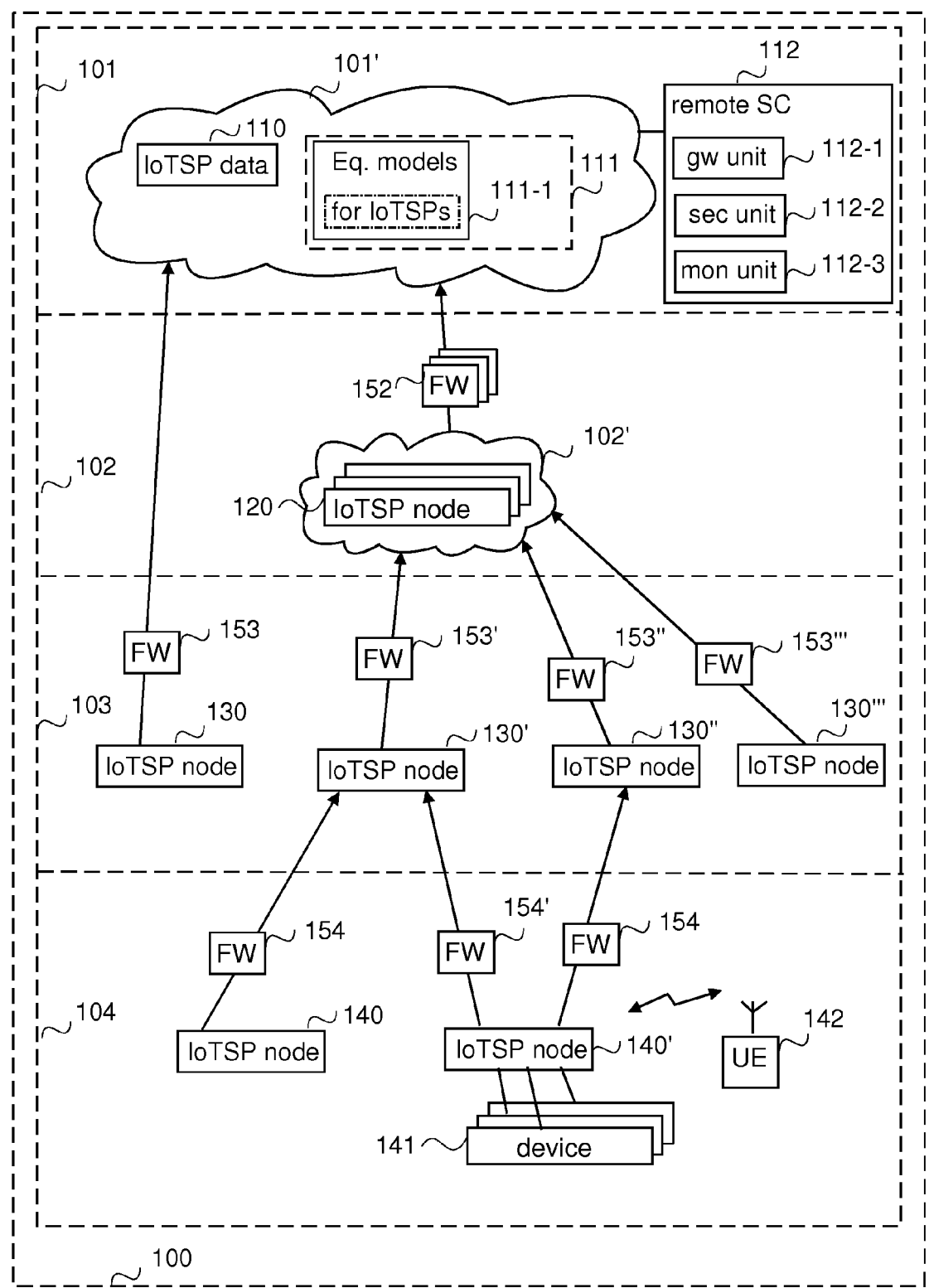
FIG. 1 shows simplified architecture of a system and a block diagram of an exemplified apparatus.

A general exemplary architecture of a system is illustrated in FIG. 1. FIG. 1 is a simplified system architecture only showing some devices, apparatuses and functional entities, all being logical units whose implementation and/or number may differ from what is shown. The connections shown in FIG. 1 are logical connections; the actual physical connections may be different. Data collection may use so called master protocols (a master is also known as a protocol client) in which a network node subscribes data from slaves (devices whose data it wants to have) and/or slave protocols (a slave is also known as a protocol server) in which a device/network node sends its data without any specific subscription to the receiver (slave/server). It is apparent to a person skilled in the art that the systems also comprise other nodes (apparatuses, devices) functions and structures used in or for Industrial Internet of Thing, big data, virtualization, data management, and communication in the system or in one part of the system. They, as well as protocols used, are well known by persons skilled in the art and are irrelevant to the actual invention. Therefore, they need not to be discussed in more detail here.

In the examples below, a concept called Internet of Things, Services and People (IoTSP) is used as an example of Industrial Internet of Things, without restricting the examples to such a concept. Further, below an equipment model is used as an example of an information model without restricting the example to the equipment model. It is obvious to one skilled in the art how to implement the disclosed principles when other information models, such as information models relating to production transactions, are used.

The architecture is based on edge computing model in which data from Things is processed by a nearby edge computing device (gateway), called herein an IoTSP node.

In the example illustrated in FIG. 1, the system 100 comprises four different hierarchical levels: a global cloud level 101 forming a level for central management, then one or more enterprise levels 102 (only one depicted in FIG. 1), one or more plant levels 103 (only one depicted in FIG. 1) and one or more device levels 104 (only one depicted in FIG. 1), that depicts a level for different "Things". It should be appreciated that any other level structure and/or hierarchy may be used between the device level 104 and the global cloud level 101.

The global cloud level 101 comprises a global cloud 101' that comprises data 110 (IoTSP data) originating from the Things. The data 110 may comprise raw data and/or analysis data. Further, the global cloud 101' comprises a global equipment model repository 111 that comprises a plurality of equipment models 111-1.

An equipment model describes metadata for interpreting semantics of an equipment. In other words, the equipment model describes properties of an equipment it models, and it's a kind of a virtual equipment type, or type definitions, to provide specific desired functionality. The term "equipment" or "equipment instance" means herein a virtual representation of a Thing. An equipment instance contains actual property values of properties of a Thing, while the equipment model describes the information model and metadata of the properties. There may be different equipment models for different hierarchy levels. The equipment model contains for each property in the model definitions, such as description, unit, aggregation rules and the data collection protocol with sampling rules. For example, an equipment model may comprise following definitions:

Name of the model
Link to owner of the model and other documentation
Version number of the model
Possible inheritance from another model
Property definitions that may contain for each property:
  data type of the property (float, integer, text, array of something, etc.), scalar or time series, unit, value range, type of histories to be collected (storage, aggregation rules, such as time averages, standard min/max, operating time, etc.), data acquisition definitions (protocol, item id, collection cycles, etc.), alarming limits. Further, the property definitions may contain rules or definitions how to map local data in a device/node to the model properties. An example of mapping definitions include defining from which variable, register, or memory location the data in the device is read to particular property value and how frequently.
Function definitions that describe which kind of functions the device can perform
Interface definitions for exposing model specific application programming interfaces (APIs)

In addition to equipment models on Things, there are one or more equipment models for gateways, denoted in FIG. 1 by IoTSP. An equipment model for a gateway may comprise both an internal configuration and security configuration for gateway operations. However, part or all of the security configurations may be given in separate equipment models, for example in equipment models for firewalls or in equipment models for ports. Internal configuration may comprise definitions defining what data on internal telemetry operations to provide, what to report, when to report and different alarm limits for alarms (that are a specific type of notifications), as will be described in more detail below. By means of security configurations, hardening of a gateway is configured. The security configurations may comprise definitions to external services to enforce hardening in other instances/devices. For example, a Thing may read from an external service its hardening configuration/rules, or at least part of them. A common security definition for gateways is an internal secure communication protocol used in gateway to gateway communications.

The model definitions for equipment models 111-1 may be according to ISA-95 type equipment model definitions, for example. ISA-95 is an ISO standard defining, among other things, standard terminology and information models, which can be used to define equipment models. It should be appreciated that any other model definitions for information models may be used as well.

To summon up, one may say that the equipment model defines semantics for the data, controls the device data recording, provides basis for analytics and applications, and basis for vizualisation, without detailed information on the actual device instances or signal names, and provides an integrated security model. The equipment model thereby provides tools for common information modelling with cyber security that is centrally engineered and applied uniformly. Thanks to that, data from heterogeneous data sources may be combined in a structured manner.

Although not illustrated in FIG. 1, in addition to or included in the equipment models, also rules for data flows are defined. The rules may be called data flow rules, data transfer rules, or communication rules, for example. A data flow rule may define what data is to be sent from the gateway, possibly also when to send the data. A data flow rule may also define what kind of data will be received and/or how the data is to be converted, if a conversion is needed, for example because of different equipment model definitions in use. It should be appreciated that the data flow rules are for data flows within the system, notifications or different outputs on user interfaces, etc. are not within the definitions of data flow rules. However, herein such a distinction is not made, and below reporting covers in addition to notifications or other information a user has subscribed, sending data according to one more data flow rules, regardless whether the rules are part of the equipment model or separate from the equipment model.

Further, as in the illustrated example, one or more remote service centers 112 (remote SC) are connected to the global cloud 101'. A remote service center may be used for defining, or updating definitions of one or more equipment models 111-1, but it may be used also for other purposes. One example of another purpose includes defining data flow rules, if such rules are not included into the equipment model. Another example for another purpose includes that, in a multi-enterprise scenario, the remote service center may provide maintenance services to different enterprises as an analysis system or part of the analysis system, and each enterprise using the maintenance services has its own one or more levels below the global level 101.

In the illustrated example at least one of the remote service centers 112 is configured to support gateway operation monitoring and comprises for that purpose a gateway unit (gw unit) 112-1 for defining/configuring one or more internal configurations of equipment models for gateways, a security unit (sec unit) 112-2 for defining/configuring one or more hardening configurations, and one or more monitoring unit 112-3 for outputting alarms, exceptions and monitoring results, other than data in data flows, received from one or more gateways. All of the units, or two of them may be integrated together.

The enterprise level 102 may comprise one or more enterprise level clouds 102' that in turn may comprise one or more gateways 120 (computing nodes), called herein IoTSP nodes. The gateways 120 in the enterprise level may provide an enterprise wide service platform for applications including equipment models and instances, data collection, enterprise analytics, and other application runtimes, for example.

The plant level 103 comprises a plurality of gateways 130, 130', 130'', 130''' (computing nodes) called herein IoTSP nodes. The gateways 130 in the plant level may provide a plant wide service platform for applications including equipment models and instances, data collection, plant analytics, and other application runtimes, for example. The plant level may be implemented by use of one or more clouds, virtual machines, and/or physical computers. As can be seen in FIG. 1, the gateways 130, 130', 130", 130''' in the plant level may be connected directly to the global cloud, and/or via one or more gateways in the enterprise level to the global cloud.

The device level 104 comprises in addition to a plurality of devices 141 one or more gateways 140, 140' (computing nodes) whereto devices 141 are connected. The gateways 140, 140' in the device level may provide a device, a system, or a production line wide service platform for applications including equipment models and instances, data collection, analytics, and other application runtimes, for example. Although not illustrated in FIG. 1, the gateways in the device level may be connected directly to the global cloud, or via one or more gateways in the enterprise level, or via one or more gateways in the device level, or as illustrated in FIG. 1 via a chain or chains of gateways in the plant level and enterprise level. It should be appreciated that although illustrated only in the device level gateway, a gateway in any level may send data (transfer data) to a plurality of gateways (two, three, four, etc.) in higher levels. For example, one gateway may send data to gateways that represent different functional purposes, for example one for asset monitoring and production tracking, one for energy management and one for gateway monitoring.

The devices 141 represent in FIG. 1 Things that the Industrial Internet of Things, or as in the example, the Industrial Internet of Things, Services and People comprises. The Things may be different devices, machines, apparatuses, equipment, systems, sub-systems, processes etc. Few examples of Things include a pump, motor, valve, car, fridge, production line and a control loop. There are no restrictions what constitutes a Thing, it suffices that the Thing comprises means for performing one or more different measurements on environment and/or one or more operations, for example, and means for sending the information at least to one or more IoTSP nodes. Further, a Thing may itself comprise Things that the analytics sees as one, combined Thing. The implementation of the Industrial Internet of Things, data collected therefrom and means used for information exchange bears no significance to the invention, and therefore they are not described in more detail here. It is obvious for one skilled in the art that any known or future solution may be used.

Further, in the illustrated example, a user (with proper access rights) at a local site may connect to gateways 140, 140' by means of his/her user equipment 142. It should be appreciated that although not depicted in FIG. 1, in each level a user may connect to a gateway by means of his/her user equipment, or via a corresponding service center to study, process etc. data on the corresponding level, on a prerequisite that the user has access rights. The procedure to verify access rights is not part of security configurations for the equipment model. Access rights verification procedures are defined in separate security structures, as is known for one skilled in the art and hence not described in detail herein. Further, no changes to the access rights verification procedures is needed.

Further, although not illustrated in FIG. 1, depending on the access rights, a user equipment at any level may comprise a gateway unit for defining/configuring one or more internal configurations of gateways on the level or lower levels and/or a security unit for defining/configuring one or more hardening configurations and/or a monitoring unit for outputting alarms, exceptions and monitoring results.

For securing the IoTSP system there are in the illustrated example one or more firewalls between gateways, i.e. IoTSP nodes, and the gateways are configured to communicate with each other using a secure communication protocol. Hence an end-to-end security is provided through an intermediate system (with a corresponding middleware) enabling secure communication between different service centers, user devices and data storages. In the example illustrated in FIG. 1 the firewalls are configured not to allow connections to southbound nodes, as depicted by directions indicated by arrow ends of the connections in FIG. 1. More precisely, the gateways 140, 140' in the device level 104 are connected via firewalls 154, 154', 154" to gateways in the upper level, or to the cloud if directly connected thereto. Further gateways in the plant level 130, 130', 130", 130''' are in turn connected via firewalls 153, 153', 153", 153''' to gateways in the upper level or to the cloud if directly connected thereto, and gateways in the enterprise level are connected via firewalls 152 to the cloud. This results to a situation in which a connection from an industrial plant to a cloud is possible, but not from the cloud to a node at the industrial plant. However, all the connections are bidirectional so that when a node is connected to its northbound neighbour, the connection is also established backwards. In such an environment the connected nodes information contains only the northbound nodes where the connection can be established. Further, the data flow rules may be bidirectional and contain a definition to which direction the data is transferred, i.e. from the southbound node to the northbound node or to the other direction. In other words, by means of the data flow rules it is possible to determine that information on gateway operations are sent from southbound node to one or more northbound nodes, and that hardening configurations are sent from a northbound node to one or more southbound nodes.

It should be appreciated that there may be also other firewalls than those depicted in FIG. 1.

Although not illustrated in FIG. 1, the connections may be over one or more networks, which may be of same type or different type. The type of the network and protocols used bear no significance to the invention and therefore are not described in more detail herein.

As said earlier, the above illustrated hierarchy depicts only one example. For example, at the device level there may be a gateway connected to a plurality of devices and to one or more gateways that in turn are connected to a plurality of devices. Further, gateways on the same level may be connected to each other. The hierarchical structure enables central management of equipment models and data flow rules including their distribution within the IoTSP node in which they are pushed from cloud to downwards in the hierarchy and thereby will be applied by all gateways (computing nodes). However, the equipment models do not have to be the same in each gateway, the data flow rules provide a tool to enable conversions between the equipment models as well as between different data types.

To summon up, FIG. 1 illustrates an IoTSP platform architecture that provides connectivity and drill-down data access through the levels to required details irrespective of the actual data storage. Further, the IoTSP platform architecture provides means for integrated management and control of essential resources from the device level up to the global cloud, including security and the devices providing the IoTSP platform. The main information flow directions are from the global cloud level to lower levels (from top to bottom) and from device level to upper levels (from bottom to top). Information propagated from top to bottom may include function calls (actions to be performed by devices), data, and metadata that is controlling the data flows, analytics, and visualization (metadata including changes in the equipment models and data flow rules), retrieval of details and actions to be performed in devices. Information sent from bottom to up includes typically measured signal and aggregated data organized according to the metadata. It should be appreciated that actual system topologies, integrations with external systems, etc. may differ based on industry requirements, and products, for example. However, the internal functionality and security of the IoTSP platform may be managed and monitored using the same way regardless of device level, plant level or enterprise level requirements, thanks to the gateway unit, security unit and monitoring unit by means of which the gateway operations to monitor and secure, and corresponding configurations, are defined.

Figure 2A:
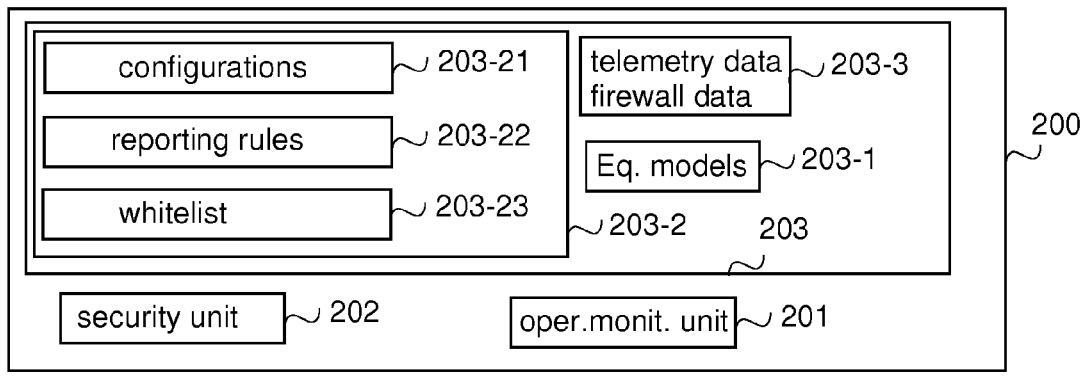
FIGS. 2A and 2B are block diagrams of other exemplified apparatuses.

FIG. 2A is a generalized block diagram of a gateway 200, i.e. an IoTSP node, representing a gateway at any level described above with FIG. 1. The gateway is a computing device (node) configured at least to send and/or receive data, either as a standalone device or embedded in an existing device. Depending on a gateway and its use, the gateway may be a small electrical device, a mobile device, a tablet, a laptop, a personal computer, or a server, just to mention some examples. Naturally, the gateway may include a data storage and/or one or more user interfaces. Although gateway-specific configurations in different levels may differ, the conceptual model illustrated herein for a gateway is the same regardless of the level.

In the illustrated example, the gateway comprises one or more operation monitoring units 201 for monitoring and reporting operations of the gateway, and if the gateway is configured to receive operation reports from other gateways, also monitoring and reporting such information. The operation monitoring unit 201 may include data management and/or analytics and/or other data processing. The data management processes incoming data, i.e. performs the defined processing, alarm detection, aggregation, and stores the data to a data storage that may be in the gateway or in a cloud. Analytics contain one or more analytic tools. An analytic tool is a special purpose analysis software (application), or a software suite (application suite). At the simplest, an analytic tool may be an application performing some simple calculations, like calculating averages, or some other data processing according to the settings in an equipment model. The analytic tool may be based on data visualization, data mining, mathematical models of an industrial process used, machine learning, such as deep learning, unsupervised learning, semisupervised learning, supervised learning, anomaly detection, and self-learning artificial intelligence, etc. However, the actual functionality and the purpose of the data management and/or analytic tools, and how it is defined what performs what, for example performs alarming, are not relevant for the invention and any known or future data management and/or analytic tool may be used.

To enforce hardening to and/or from the gateway 200, the gateway comprises a security unit 202.

Further, for monitoring and/or hardening, the gateway comprises in its memory 203 different information including equipment models 203-1, operational settings 203-2 of the gateway, and telemetry data and firewall data 203-3.

The equipment models 203-1 comprise as equipment models 203-1 either a copy of each equipment model in the cloud level, or a copy of each equipment model belonging to a subset of equipment models in the cloud level. The copies are preferably installed and updated centrally and automatically, from the global cloud level, for example. However, it should be appreciated that local installation and/or updating is also possible.

In the illustrated example, the operational settings 203-2 comprise configurations 203-21, reporting rules 203-22 and whitelist 203-23. The configurations 203-21 comprise in the illustrated example internal configurations and security configurations. The internal configurations define telemetry data which to collect, such as CPU (central processing unit) usage, input/output usage, and memory usage. The telemetry data may be collected, if needed, in a rather detailed way. The reporting rules 203-22 may define what to report and when to report. For example, different key performance indicators (KPIs), such as data processing throughput, latencies and different statistics (the amount of data transmitted, how many statistical numbers have been calculated, etc.), may be reported at certain intervals, or if any of them exceeds a preset limit or is below a preset limit or is not within a preset limit range. Further, the reporting rules 203-22 contain information on notifications and alarms (what to send and to whom). Although data traffic from the gateway to one or more other gateways needs only one open port (port 443), different data transfer protocols to other devices, including user equipment and service centers, require use of other ports. Thanks to the security configurations included in an equipment model for the firewall, or if there are different types of firewalls, in equipment models for the firewalls, central security policy management can be used for security hardening. The security configurations comprises port configuration defining how to set up firewalls (not illustrated in FIG. 1) allowing use of other ports, for example. The reporting rules for security may define exceptions that causes alarms to be sent to the remote service center, and reporting certain statistic. Further, the whitelist 203-23 comprises for the security unit information on those applications (software) that are allowed to run in the gateway. Naturally, instead of a whitelist, a blacklist listing applications that are not allowed to run, may be used.

Further, the gateway illustrated in the example comprises in a memory 203 telemetry data (raw data and calculated aggregates etc.) and firewall data (log information, different security events, exceptions and alerts). Naturally also other raw data and analysis data may be stored to the memory 203.

It should be appreciated that FIG. 2A illustrates only one example. For example, any other storage arrangement may be used and/or the operation monitoring unit 202 and the security unit 201 may be integrated into one unit, or one or both of the units may be further divided to sub-units. In other implementations, the gateway may comprise only one of the security unit 201 and the operation monitoring unit 202, and only corresponding information in the memory 203.

Figure 2B:
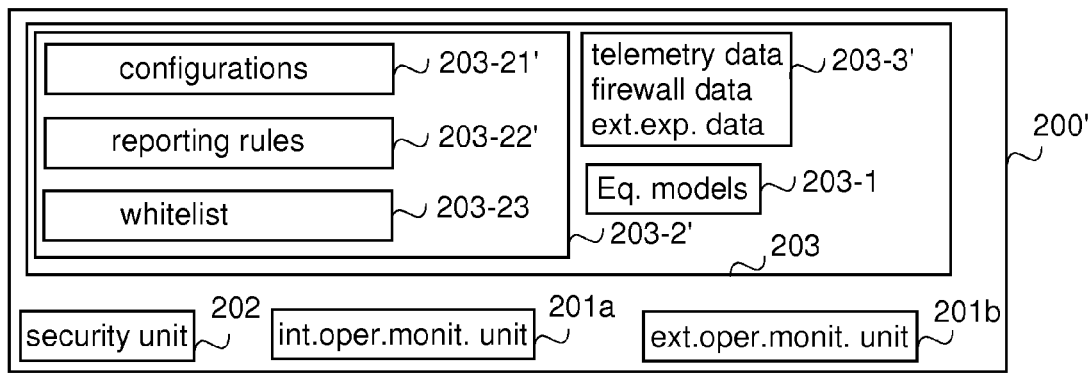

FIG. 2B is a generalized block diagram of a gateway 200', i.e. an IoTSP node, representing a gateway at any level described above with FIG. 1, the gateway differing from the gateway illustrated in FIG. 2A in that respect that the gateway is further configured to monitor and report external experience data. For that purpose, the gateway 200' comprises one or more external operation monitoring units 201b, the memory 203 comprises in addition to the telemetry data and firewall data also collected and/or calculated external experience data 203-3' and the operation settings 203-2' comprise additional settings. More precisely, the configurations 203-21' comprise, in addition to the internal configurations and the security configurations, also external configurations that define external experience data which to collect, and the reporting rules 203-22' define also for the external experience data what to report and when to report The reporting rules 203-22 may define what to report and when to report. Examples of external experience data comprises data transfer latencies and responsiveness, such as response times, of (APIs) and responsiveness of dashboards, typically displayed on user interfaces.

The one or more internal operation monitoring units 201a in the gateway 200' of FIG. 2B correspond to the one or more operation monitoring unit 201 in FIG. 2A. Naturally, the internal and external operation monitoring units may be integrated into one unit. It should be appreciated that although in FIG. 2B the external operation monitoring unit 201b is depicted as being part of the IoTSP node (the gateway), that implies to logical implementation only, the actual physical devices in which the different units locate may be different. For example, an external display may comprise an external monitoring unit 201b to monitor reactiveness of dashboards.

Basic functionality of the operation monitoring unit, or the internal operation monitoring unit, or corresponding instance for telemetry data, is described below with FIG. 3. In the example, it is assumed that if an operational parameter's value exceeds corresponding preset limit, an alarm is caused, without restricting the example to such a preset limit.

Figure 3:
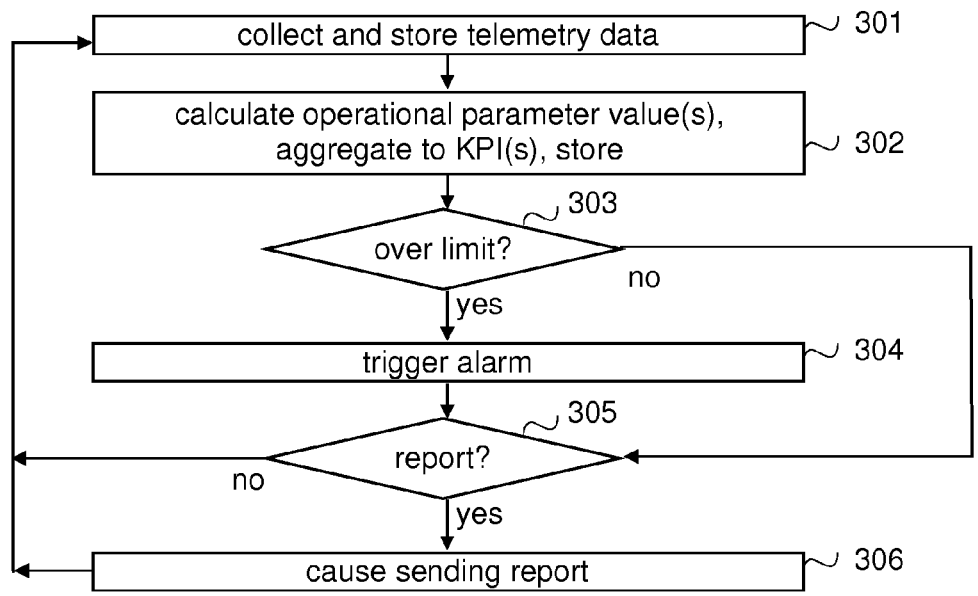
FIGS. 3 to 7 are flow charts illustrating exemplary functionalities.

Referring to FIG. 3, while telemetry data on the gateway is collected and stored in step 301, one or more operational parameter values may be calculated and stored in step 302 from the data, and/or data may be aggregated in step 302 to one or more key performance indicators (KPIs) and then stored, according to what is defined in the internal configuration in the related equipment model. It should be appreciated that for each property in a corresponding equipment model there may be specific definitions defining how the property or its value is published (reported, i.e. sent from the gateway to northbound gateways) and/or how the value is aggregated before publishing. Different resource usages, such as CPU usage, input/output usage and memory usage, are operational parameters whose values may be calculated or aggregated. When a value is calculated, it is checked in step 303, whether the value is over the preset limit (i.e. exceeds a limit). If it is, an alarm is triggered in step 304 causing sending a notification to one or more user equipment and/or service centers, as defined in the reporting rules, using a preferred media, so that the alarm is delivered in praxis in real time. Then, or if the value is not over the preset limit (step 303: no), it is checked in step 305, whether or not a condition to report is met. If a condition to report is met (step 305: yes), sending a report including, for example, the operational parameter values and/or one or more key performance indicators (KPIs), as indicated in the reporting rules, is caused in step 307. The process then continues to collect (step 301) telemetry data. If a condition to report is not met (step 305: no), the process continues to step 301 to collect telemetry data.

It should be appreciated that before causing sending the report, data in the report may be converted from the local data structure, and/or if telemetry data is received from another gateway, before processing it, the data may be converted to be according to the local data structure, as defined for example in the reporting rules and/or in the equipment model definitions.

Basic functionality of the external operation monitoring unit, or corresponding instance, is described below with FIG. 4. In the example it is assumed that the external experience data does not cause an alarm, without restricting the functionality of the external operation monitoring unit to such a solution. It is a straightforward implementation for one skilled in the art to implement an alarm functionality, described with internal data, to external experience data as well.

Figure 4:
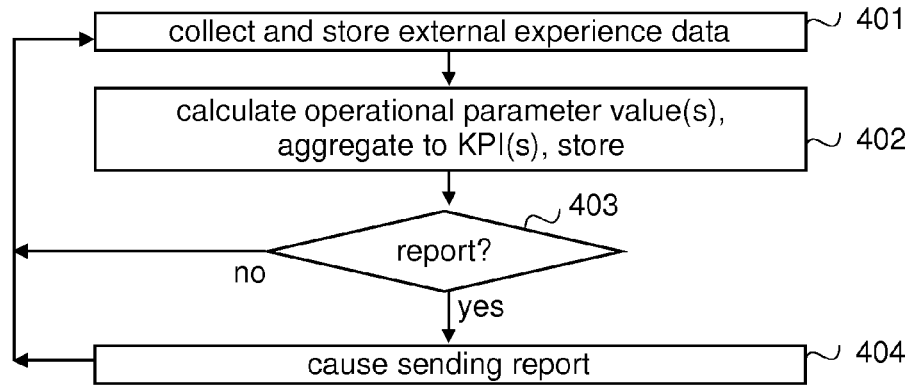

Referring to FIG. 4, while external experience data, i.e. external experience provided by the gateway, is collected and stored in step 401, one or more operational parameter values may be calculated and stored in step 402 from the data, and/or data may be aggregated in step 402 to one or more key performance indicators (KPIs) and then stored, according to what is defined in the internal configuration in the related equipment model for external experience data. As with telemetry data, also for external experience data for each property in a corresponding equipment model there may be specific definitions defining how the property or its value is published (reported, i.e. sent from the gateway to northbound gateways) and/or how the value is aggregated before publishing. Different times, such as data transfer latencies and response times of APIs for external softwares and response times of dashboards displayed in user interface, are operational parameters whose values may be calculated or aggregated. Then it is checked in step 403, whether a condition to report is met. If a condition to report is met (step 403: yes), sending a report including for example the operational parameter values and/or one or more key performance indicators (KPIs), as indicated in the reporting rules for external experience data, is caused in step 403. The process then continues to collect (step 401) external experience data. If a condition to report is not met (step 403: no), the process continues to step 301 to collect telemetry data.

It should be appreciated that before causing sending the report, the data in the report may be converted from the local data structure, and/or if external experience data is received from another gateway, before processing it, the data may be converted to be according to the local data structure, as defined for example in the reporting rules and/or in the equipment model definitions.

Figure 5:
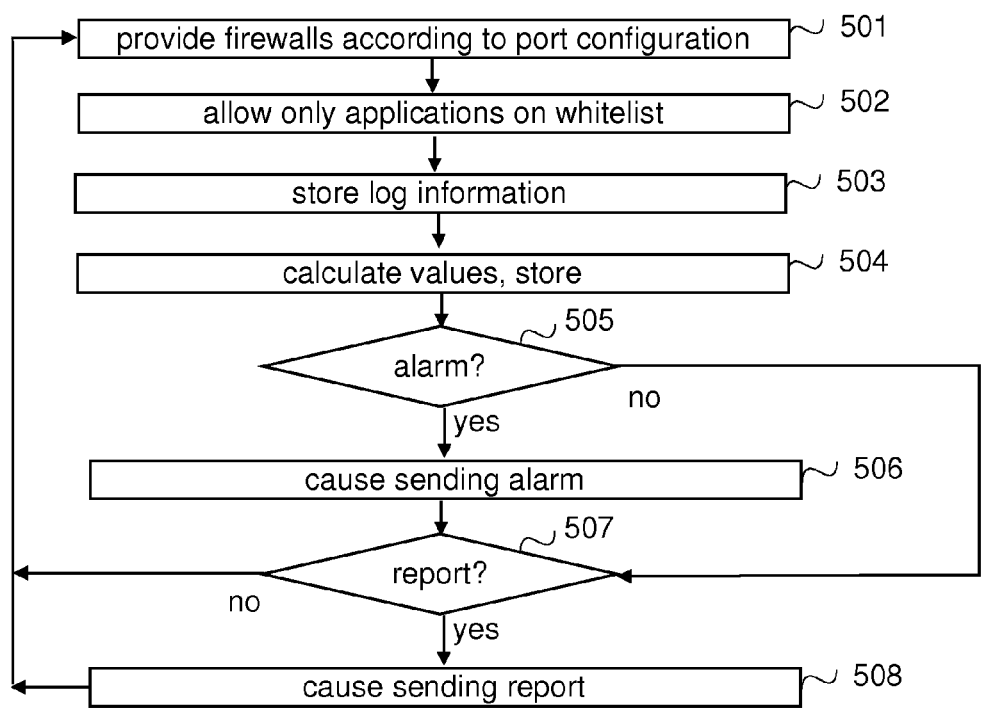

Basic functionality of the security unit, or corresponding instance, is described with FIG. 5. In the example, it is assumed that whitelisting is used without restricting the example to such a solution. It should be appreciated that the process may run in parallel with the process described with FIG. 3, or with the processes described with FIGS. 3 and 4.

Referring to FIG. 5, the security unit provides in step 501 one or more firewalls according to the port configuration in the security configurations, and only applications who are listed in the whitelist (whitelisted software) are allowed in step 502. Naturally security related log information (raw firewall data) is stored in step 503, and security related parameter values may be calculated and stored in step 504 according to reporting rules and/or security configuration definitions and/or according to what is defined in a corresponding equipment model instance. Meantime it is monitored (step 505), whether any of log information or parameter value fulfils criteria set in the reporting rules for security alerts. If the alert criteria is met (step 505: yes), sending an alarm is caused in step 506 as a notification to one or more user equipment and/or service centers, as defined in the reporting rules, using a preferred media, so that the alarm is delivered in praxis in real time. Then, or if the alarm criteria is not met limit (step 505: no), it is checked in step 507, whether or a condition to report to the service center and/or to one or more user equipment, or to a higher level gateway is met. If a condition to report is met (step 507: yes), sending a report including the operational parameter values and/or one or more key performance indicators (KPIs), as indicated in the reporting rules, is caused in step 508. Regardless whether or not a report is sent, firewall functionality is provided all the time.

Figure 6:
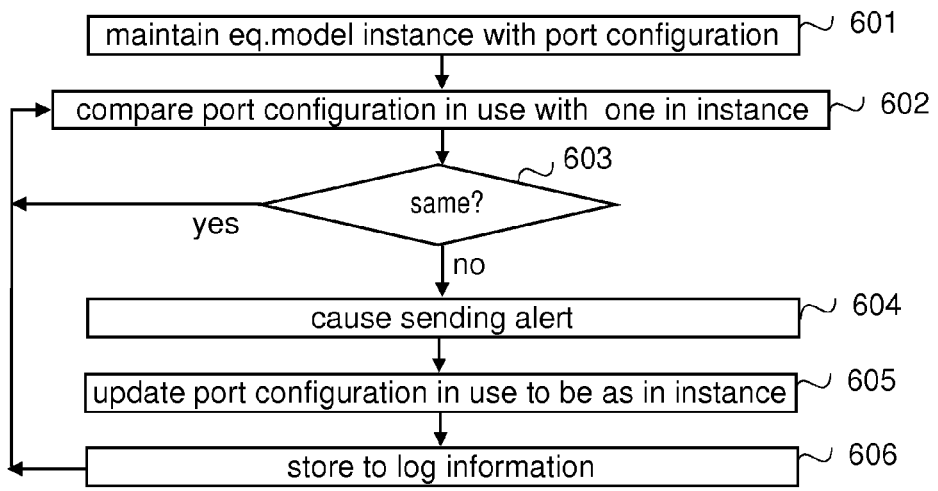

In parallel the security unit monitors status of the security configuration to detect a change or violation in the security configuration. An example of the status monitoring is illustrated in FIG. 6 for a port configuration. It should be appreciated that the status monitoring may be performed to multiple port configurations and also to other hardening configurations (security configurations) either as separate parallel processes or as a combined process for all.

Referring to FIG. 6, for each firewall an equipment model instance of the firewall, comprising port configuration, for example, is maintained in step 601 in a memory of the gateway, and at certain intervals a port configuration in use is compared in step 602 with the port configuration in the corresponding equipment model instance to find out, whether there are any changes. In other words, it is checked, whether security configurations that are according to corresponding definitions in the equipment model instance have remained the same. If the configurations in use are the same (step 603: yes) as in the corresponding equipment model instance, the monitoring is continued and the process returns to step 602.

If the configurations in use are not the same (step 603: no) as in the corresponding equipment model instance, this means that an exception or violation is detected, and sending of an alert to the remote service center and/or to one or more user equipment, according to corresponding reporting rules, is caused in step 604. This provides real-time alerts and violation detection. Further, the port configuration (or any monitored security configuration) in use is updated in step 605 to be in accordance with the port configuration in the corresponding equipment model instance. This enhances the security, since even if someone has succeeded to obtain fraudulent access, no changed settings will be used, or they will be used only a short time. Further, in the illustrated example, the exceptions are stored in step 606 to the log information (firewall data). Naturally the monitoring is continued and the process returns to step 602.

It should be appreciated that in another implementation all monitoring results are stored to the log information, i.e. the process proceeds from step 603 to step 606 to store the log information if the configuration in use is the same as the the configuration in the corresponding equipment instance.

Figure 7:
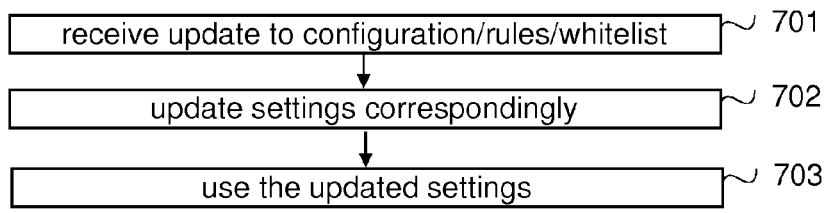

FIG. 7 illustrates functionality of the operation monitoring unit, or the internal operation monitoring unit or the external operation monitoring unit, or the security unit, or the gateway may comprise a specific updating unit performing the functionality. Upon receiving in step 701 an update to at least one of the configurations, reporting rules and whitelist, the settings in the memory are updated in step 702 correspondingly, and the updated settings are taken in step 703 into use in the processes described above.

The steps, points, messages (i.e. information exchange) and related functions described above in FIGS. 2A to 7 are in no absolute chronological order, and some of the steps may be performed simultaneously or in an order differing from the given one. Other functions can also be executed between the steps or within the steps, and other information may be sent. Examples of such information and functionality include data gathering/receiving and data analysis, the data originating from Things. Some of the steps or part of the steps can also be left out or replaced by a corresponding step or part of the step.

The techniques described herein may be implemented by various means so that an apparatus/device implementing one or more functions described with an embodiment, or a combination of embodiments, comprises not only prior art means, but also specific means for implementing the one or more functions described with an embodiment and it may comprise separate means for each separate function, or specific means may be configured to perform two or more functions. The specific means may be software and/or software-hardware and/or hardware and/or firmware components (recorded indelibly on a medium such as read-only-memory or embodied in hard-wired computer circuitry) or combinations thereof. Software codes may be stored in any suitable, processor/computer-readable data storage medium(s) or memory unit(s) or article(s) of manufacture and executed by one or more processors/computers, hardware (one or more apparatuses), firmware (one or more apparatuses), software (one or more modules), or combinations thereof. For a firmware or software, implementation can be through modules (e.g., procedures, functions, and so on) that perform the functions described herein.

Figure 8:
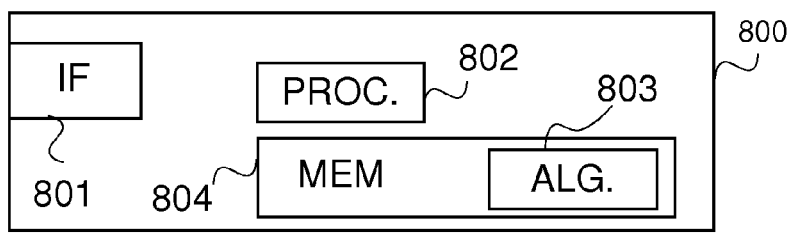
FIG. 8 is a schematic block diagram.

FIG. 8 is a simplified block diagram illustrating some units for a device (an apparatus) 800 configured to be an gateway for IoTSP, or a corresponding computing device, comprising at least one or more security units and/or one or more operation monitoring units described above with FIGS. 1 to 7 or corresponding functionality or some of the corresponding functionality if functionalities are distributed in the future. In the illustrated example, the device comprises one or more interfaces (IF) 801 for receiving and/or retrieving and/or transmitting information from or to other devices, and possibly from or to a user, a processor 802 configured to implement the security unit and/or the operation monitoring unit and/or the internal operation monitoring and/or the external operation monitoring unit, described herein, or at least part of corresponding functionality as a sub-unit functionality if distributed scenario is implemented, with corresponding algorithms 803, and memory 804 usable for storing a computer program code required for the one or more security units and/or for the one or more operation monitoring units, and/or for the internal operation monitoring and/or for the external operation monitoring unit, or for one or more corresponding units or sub-units, i.e. the algorithms for implementing the functionality. The memory 804 is also usable for storing other possible information, like the configurations, white list, reporting rules, equipment models, telemetry data, firewall data etc.

In other words, a device (apparatus) configured to provide the gateway for IoTSP, or a device/apparatus configured to provide one or more corresponding functionalities described above with FIGS. 1 to 7, is a computing device that may be any apparatus or device or equipment or node configured to perform one or more of corresponding device functionalities described with an embodiment/example/implementation, and it may be configured to perform functionalities from different embodiments/examples/implementations. The one or more security units and/or the one or more operation monitoring units, and/or the internal operation monitoring and/or the external operation monitoring unit, as well as corresponding units and sub-units may be separate units, even located in another physical apparatus, the distributed physical apparatuses forming one logical apparatus/device providing the functionality, or integrated to another unit in the same apparatus/device.

The device/apparatus configured to provide the gateway for IoTSP, or a device configured to provide one or more corresponding functionalities may generally include a processor, controller, control unit, micro-controller, or the like connected to a memory and to various interfaces of the apparatus. Generally, the processor is a central processing unit, but the processor may be an additional operation processor. Each or some or one of the units/sub-units and/or algorithms described herein may be configured as a computer or a processor, or a microprocessor, such as a single-chip computer element, or as a chipset, including at least a memory for providing storage area used for arithmetic operation and an operation processor for executing the arithmetic operation. Each or some or one of the units/sub-units and/or algorithms described above may comprise one or more computer processors, application-specific integrated circuits (ASIC), digital signal processors (DSP), digital signal processing devices (DSPD), programmable logic devices (PLD), field-programmable gate arrays (FPGA), logic gates and/or other hardware components that have been programmed and/or will be programmed by downloading computer program code (one or more algorithms) in such a way to carry out one or more functions of one or more embodiments/implementations/examples. An embodiment provides a computer program embodied on any client-readable distribution/data storage medium or memory unit(s) or article(s) of manufacture, comprising program instructions executable by one or more processors/computers, which instructions, when loaded into a device, constitute the security unit and/or the operation monitoring unit and/or the internal operation monitoring and/or the external operation monitoring unit, or any sub-unit. Programs, also called program products, including software routines, program snippets constituting "program libraries", applets and macros, can be stored in any medium and may be downloaded into an apparatus. In other words, each or some or one of the units/sub-units and/or the algorithms described above may be an element that comprises one or more arithmetic logic units, a number of special registers and control circuits.

Further, the device/apparatus configured to provide the gateway for IoSTP, or a device configured to provide one or more corresponding functionalities described above with FIGS. 1 to 7 may generally include volatile and/or non-volatile memory, for example EEPROM, ROM, PROM, RAM, DRAM, SRAM, double floating-gate field effect transistor, firmware, programmable logic, etc. and typically store content, data, or the like. The memory or memories may be of any type (different from each other), have any possible storage structure and, if required, being managed by any database management system. In other words, the memory, or part of it, may be any computer-usable non-transitory medium within the processor/apparatus or external to the processor/apparatus, in which case it can be communicatively coupled to the processor/apparatus via various means as is known in the art. Examples of an external memory include a removable memory detachably connected to the apparatus, a distributed database and a cloud server. The memory may also store computer program code such as software applications (for example, for one or more of the units/sub-units/algorithms) or operating systems, information, data, content, or the like for the processor to perform steps associated with operation of the apparatus in accordance with examples/embodiments.

It will be obvious to a person skilled in the art that, as technology advances, the inventive concept can be implemented in various ways. The invention and its embodiments are not limited to the examples described above but may vary within the scope of the claims.

The invention claimed is:

1. A method for a device acting as a gateway in a system comprising plurality of Industrial Internet of Things, the method comprising:

providing the device with gateway configurations defining at least how to monitor gateway operations of the device itself when the device is acting as a gateway;

monitoring, by the device, the gateway operations of the device itself according to the gateway configurations;

providing, in the gateway configurations for the gateway operations, security configurations;

applying by the device the security configurations;

maintaining security configurations in corresponding equipment model instances in the device;

comparing security configurations currently in use in the device with the security configurations in a corresponding equipment model instance in the device; and if they are not the same, causing sending an alert and updating the security configurations currently in use to be the same as the security configurations in the corresponding equipment model instance.

2. The method of claim 1, providing, in the gateway configurations for the gateway operations, internal configurations defining telemetry data which to collect, what information based on the collected telemetry data to report and when to report;

collecting, by the device, telemetry data according to the internal configurations; and reporting, by the device, information on the collected telemetry data according to the internal configurations.

3. The method of claim 2, wherein the telemetry data to be collected comprises one or more of central processing unit usage, input usage, output usage and memory usage.

4. The method of claim 1, further comprising:

providing, in the gateway configurations for the gateway operations, external configurations defining external experience data which to collect, what information based on the collected external experience data to report and when to report;

collecting, by the device, external experience data according to the external configurations; and reporting, by the device, information on the collected external experience data according to the external configurations.

5. The method of claim 4, wherein the external experience data to be collected comprises one or more of data transfer latencies, responsiveness of user interface dashboards, and responsiveness of application programming interfaces.

6. The method of claim 1, wherein the security configurations comprise one or more of one or more port configurations defining how to set up one or more firewalls, one or more exceptions to be reported and information on applications allowed to run in the computing device.

7. The method of claim 1, further comprising:

providing the device with the gateway configurations via one or more centrally defined and maintained information models, downloaded to the device.

8. A non-transitory computer readable storage medium comprising program instructions which, when executed by a computing device acting as a gateway in a system comprising plurality of Industrial Internet of Things, cause the computing device to perform at least the following:

monitoring gateway operations of the computing device itself according to the gateway configurations provided to the computing device, the gateway configurations defining at least how to monitor gateway operations of the computing device itself acting as the gateway;

providing, in the gateway configurations for the gateway operations, security configurations;

applying by the computing device the security configurations;

maintaining security configurations in corresponding equipment model instances in the computing device;

comparing security configurations currently in use in the computing device with the security configurations in a corresponding equipment model instance in the computing device;

if they are not the same, causing sending an alert and updating the security configurations currently in use to be the same as the security configurations in the corresponding equipment model instance.

9. The non-transitory computer readable storage medium of claim 8, further comprising program instructions which, when executed by the computing device case the computing device to perform:

collecting, in response to the gateway configurations for the gateway operations comprising internal configurations defining telemetry data, which to collect, what information based on the collected telemetry data to report and when to report, telemetry data according to the internal configurations;

reporting information on the collected telemetry data according to the internal configurations;

collecting, in response to the gateway configurations for the gateway operations comprising external configurations defining external experience data which to collect, what information based on the collected external experience data to report and when to report, external experience data according to the external configurations; and reporting information on the collected external experience data according to the external configurations.

10. An apparatus comprising at least one processor and at least one memory including computer program code, wherein the at least one memory and the computer program code are configured to, with the at least one processor, cause the apparatus to perform at least:

acting as a gateway in a system comprising plurality of Industrial Internet of Things;

providing the apparatus with gateway configurations defining at least how to monitor gateway operations of the apparatus itself acting as a gateway;

monitoring the gateway operations of the apparatus itself according to the gateway configurations;

providing in the gateway configurations for the gateway operations security configurations;

applying the security configurations;

maintaining security configurations in corresponding equipment model instances in the apparatus;

comparing security configurations currently in use in the apparatus with security configurations in a corresponding equipment model instance in the apparatus; and if they are not the same, causing sending an alert and updating the security configurations currently in use to be the same as the security configurations in the corresponding equipment model instance.

11. The apparatus of claim 10, wherein the apparatus is an edge computing node in an Industrial Internet of Things.

12. The apparatus of claim 10, wherein the apparatus is configured to receive the gateway configurations from one or more northbound apparatuses.

13. The apparatus of claim 10, wherein the at least one memory and the computer program code are configured to, with the at least one processor, further cause the apparatus to perform at least:

providing, in the gateway configurations for the gateway operations, internal configurations defining telemetry data which to collect, what information based on the collected telemetry data to report and when to report;

collecting telemetry data according to the internal configurations; and causing reporting information on the collected telemetry data according to the internal configurations.

14. The apparatus of claim 10, wherein the at least one memory and the computer program code are configured to, with the at least one processor, further cause the apparatus to perform at least:

providing in the gateway configurations for the gateway operations external configurations defining external experience data which to collect, what information based on the collected external experience data to report and when to report;

collecting external experience data according to the external configurations; and causing reporting information on the collected external experience data according to the external configurations.

15. The apparatus of claim 10, wherein the security configurations comprise one or more of one or more port configurations defining how to set up one or more firewalls, one or more exceptions to be reported and information on applications allowed to run in the apparatus.

16. A computerized method comprising:

providing a computing device acting as a gateway in a system, which comprises gateways as Industrial Internet of Things nodes, with a configuration of a gateway comprising an internal configuration defining at least how to monitor gateway operations of the computing device itself acting as a gateway by defining telemetry data which to collect on internal telemetry operations of the computing device acting as a gateway, what information based on the collected telemetry data to report and when to report;

monitoring, by the computing device, the gateway operations of the computing device itself according to the internal configuration;

collecting, by the computing device, according to the internal configurations, telemetry data on the internal telemetry operations of the computing device acting as a gateway; and reporting, by the computing device, information on the collected telemetry data according to the internal configuration.

17. A non-transitory computer readable storage medium comprising program instructions which, when executed by a computing, cause the computing device to perform at least the following:

acting as a gateway in a system, which comprises gateways as Industrial Internet of Things nodes, with;

monitoring the gateway operations of the computing device itself according to an internal configuration comprised in a configuration of a gateway, the internal configuration defining at least how to monitor gateway operations of the computing device itself acting as a gateway by defining telemetry data which to collect on internal telemetry operations of the computing device acting as a gateway, what information based on the collected telemetry data to report and when to report;

collecting according to the internal configurations, telemetry data on the internal telemetry operations of the computing device acting as a gateway; and reporting information on the collected telemetry data according to the internal configuration.

18. An apparatus comprising at least one processor and at least one memory including computer program code, wherein the at least one memory and the computer program code are configured to, with the at least one processor, cause the apparatus to perform at least:
- acting as a gateway in a system, which comprises gateways as Industrial Internet of Things nodes;
- monitoring, by the computing device, the gateway operations of the computing device itself according to an internal configuration comprised in a configuration of a gateway provided to the apparatus, the internal configuration defining at least how to monitor gateway operations of the apparatus itself acting as a gateway by defining telemetry data which to collect on internal telemetry operations of the apparatus acting as a gateway, what information based on the collected telemetry data to report and when to report;
- collecting, according to the internal configurations, telemetry data on the internal telemetry operations of the apparatus acting as a gateway; and
- reporting information on the collected telemetry data according to the internal configuration.

* * * * *